United States Patent
Funabashi et al.

(10) Patent No.: US 7,515,377 B2
(45) Date of Patent: Apr. 7, 2009

(54) STORAGE APPARATUS AND CONTROL METHOD FOR DETECTING VIBRATION PRODUCED DURING SEEKING

(75) Inventors: Kei Funabashi, Kawasaki (JP); Tomoyoshi Yamada, Kawasaki (JP); Takeyori Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/982,976

(22) Filed: Nov. 5, 2007

(65) Prior Publication Data

US 2008/0170320 A1     Jul. 17, 2008

(30) Foreign Application Priority Data

Jan. 15, 2007    (JP)    ............... 2007-005506

(51) Int. Cl.
*G11B 5/55*    (2006.01)
(52) U.S. Cl. ................... 360/78.11; 360/78.04
(58) Field of Classification Search ............ None
See application file for complete search history.

(56) References Cited

U.S. PATENT DOCUMENTS

| | | | |
|---|---|---|---|
| 4,477,755 A * | 10/1984 | Rickert | 360/78.09 |
| 6,064,540 A * | 5/2000 | Huang et al. | 360/77.03 |
| 6,295,184 B1 * | 9/2001 | Takekado | 360/78.05 |
| 6,496,323 B1 * | 12/2002 | Umeda et al. | 360/78.09 |
| 6,614,613 B1 * | 9/2003 | Huang et al. | 360/77.03 |
| 6,667,844 B1 * | 12/2003 | Yao et al. | 360/75 |
| 6,977,790 B1 * | 12/2005 | Chen et al. | 360/75 |
| 7,126,782 B2 * | 10/2006 | Koganezawa | 360/75 |

FOREIGN PATENT DOCUMENTS

| | | |
|---|---|---|
| JP | 11-203808 | 7/1999 |
| JP | 11-317033 | 11/1999 |

* cited by examiner

*Primary Examiner*—Hoa T Nguyen
*Assistant Examiner*—James L Habermehl
(74) *Attorney, Agent, or Firm*—Greer, Burns & Crain, Ltd.

(57) ABSTRACT

An actuator supports a head at one end of a rotatably supported shaft unit and supports a coil of a voice coil motor at the other end, and moves the head to an arbitrary track position of a recording medium. A sensor, attached to a coil support unit of the actuator, detects the coil vibration and outputs a vibration detected signal. A control unit controls the actuator to reduce a head position error signal based on the vibration detected signal of the sensor in time of seek and in time of settling of moving the head to a target track position on the medium through drive of the actuator and drawing the same. The vibration detected signal of the sensor includes bending vibration component of the coil and the twisting vibration component of the coil when the actuator is driven.

20 Claims, 19 Drawing Sheets

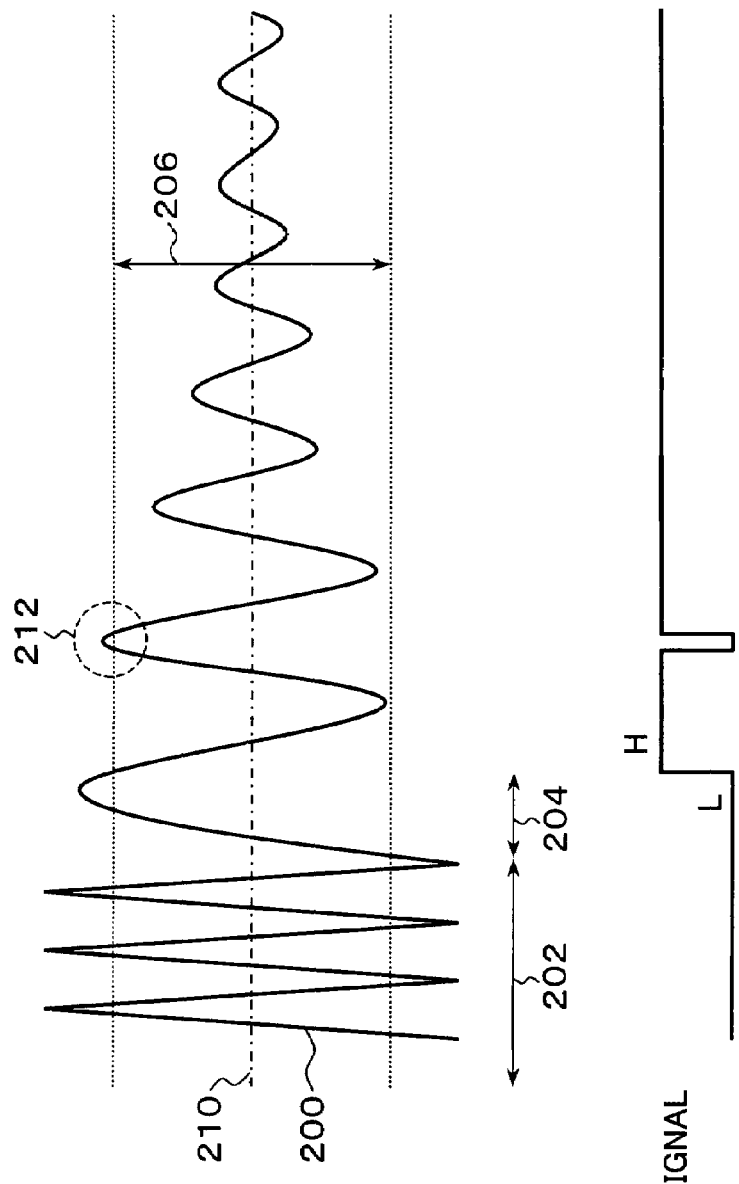
PRIOR ART
FIG. 1A
PRIOR ART
FIG. 1B

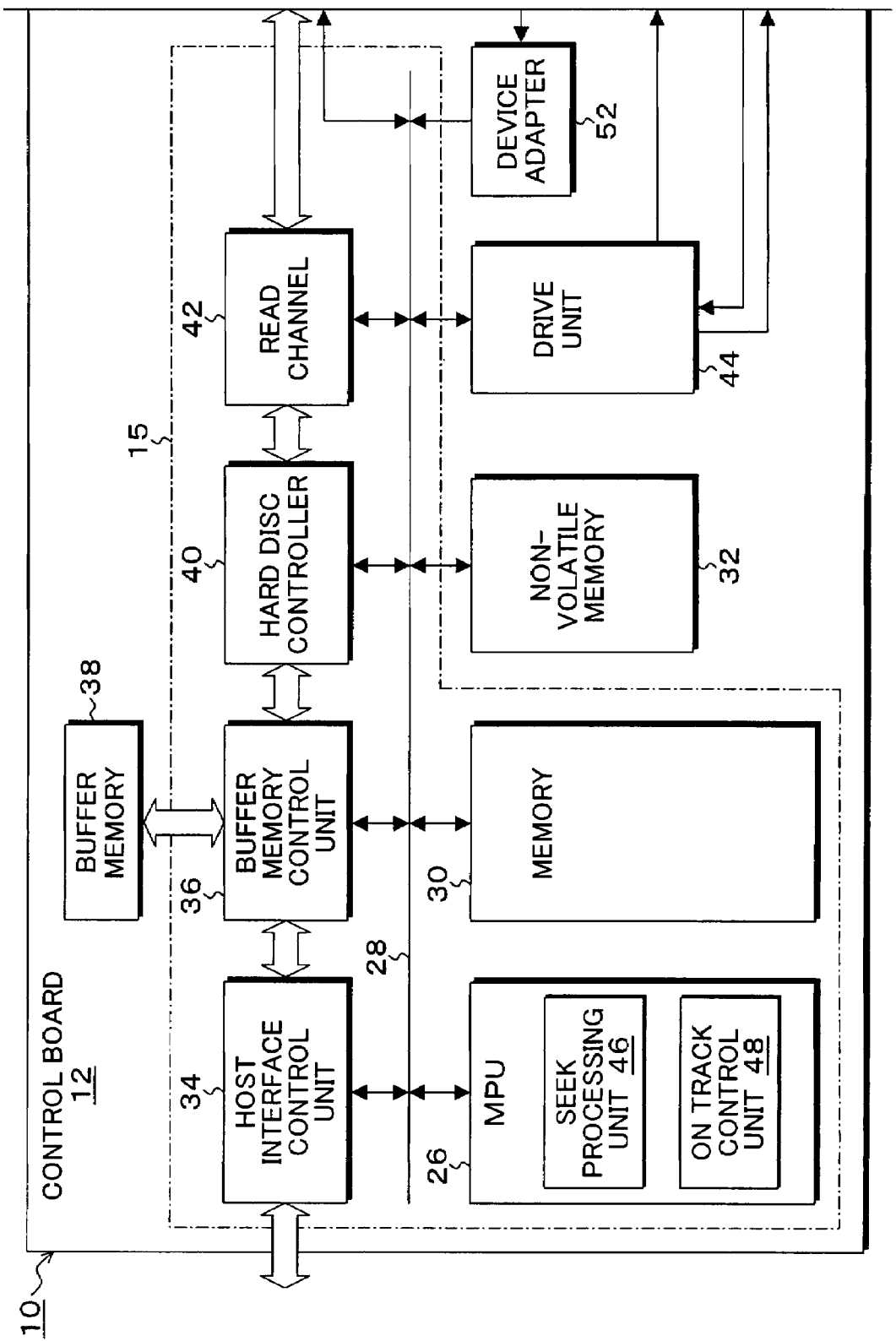

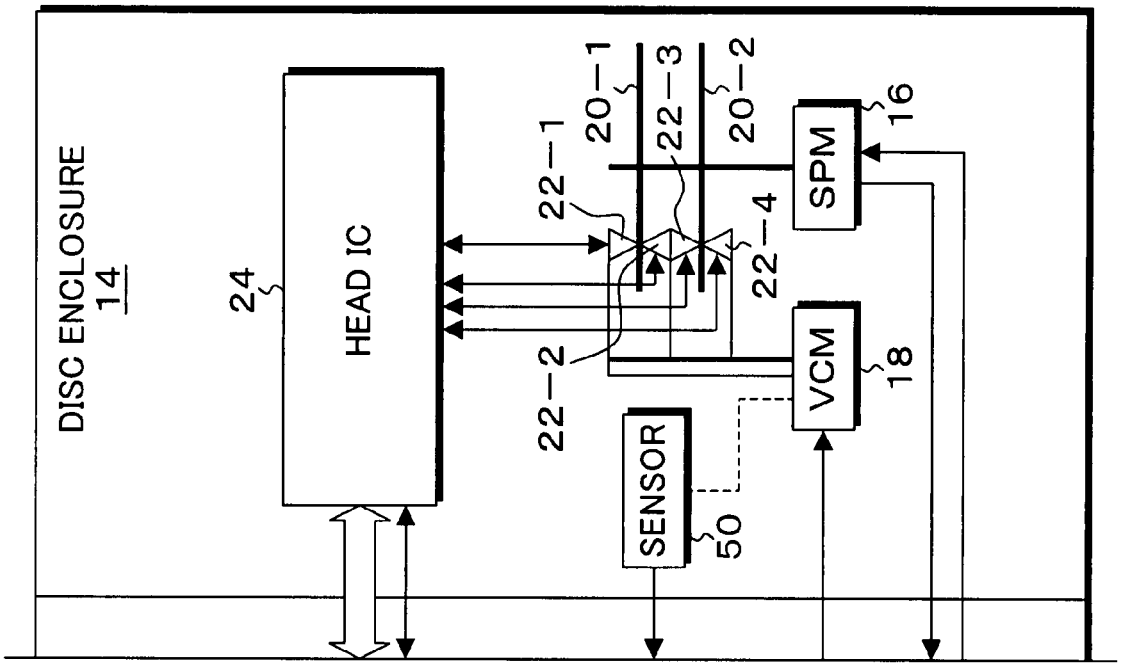

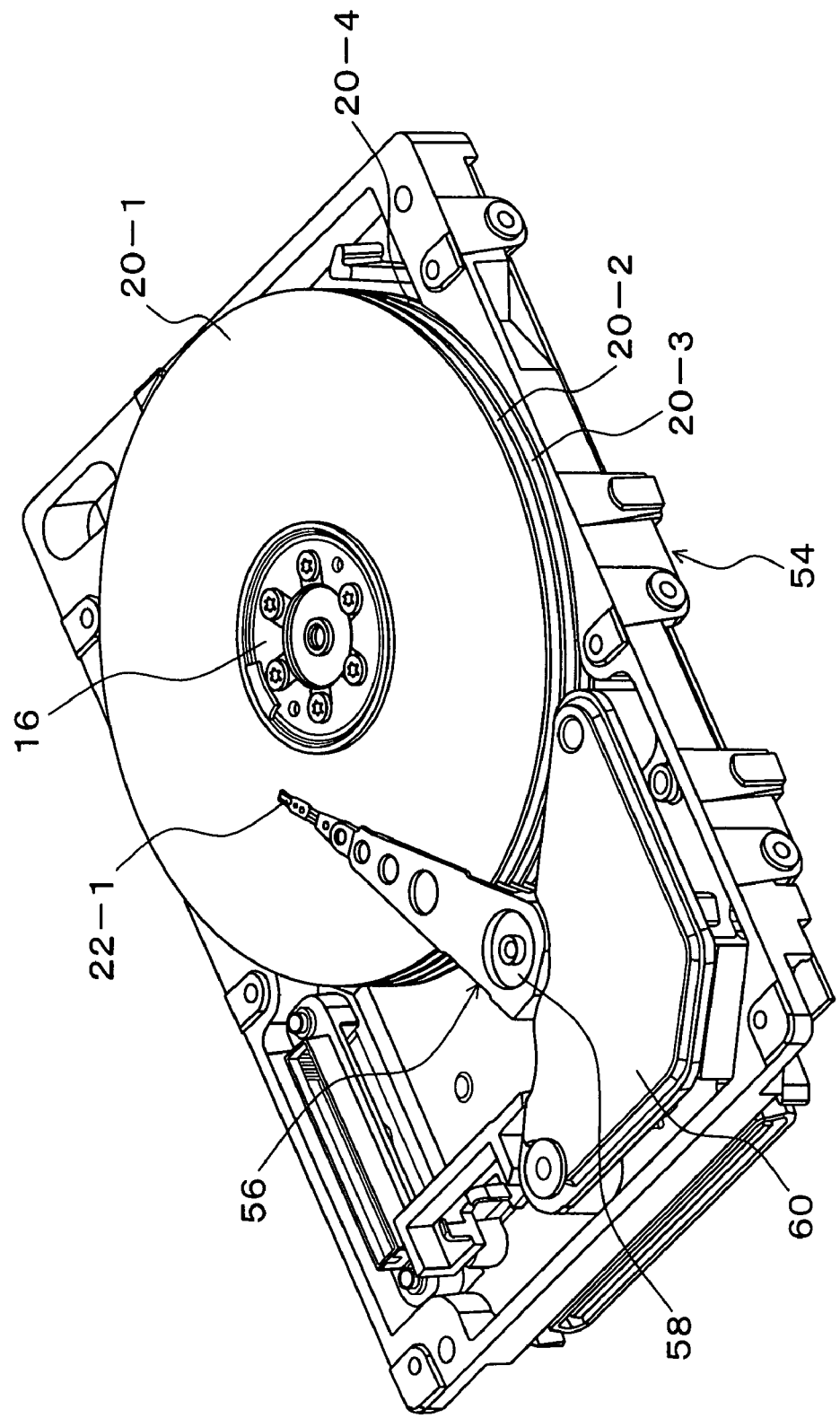
FIG. 3

FIG. 4
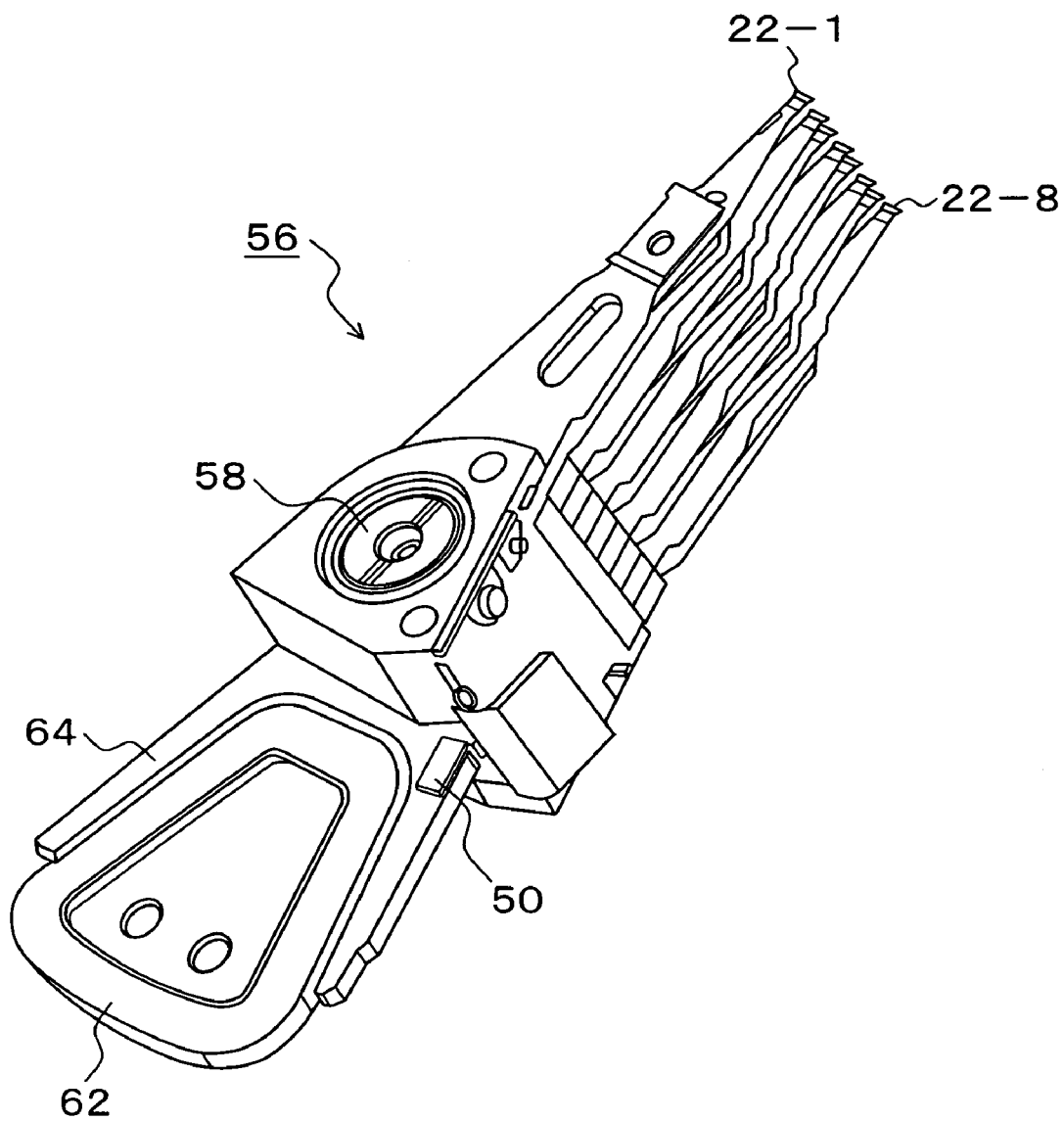

FIG. 5A
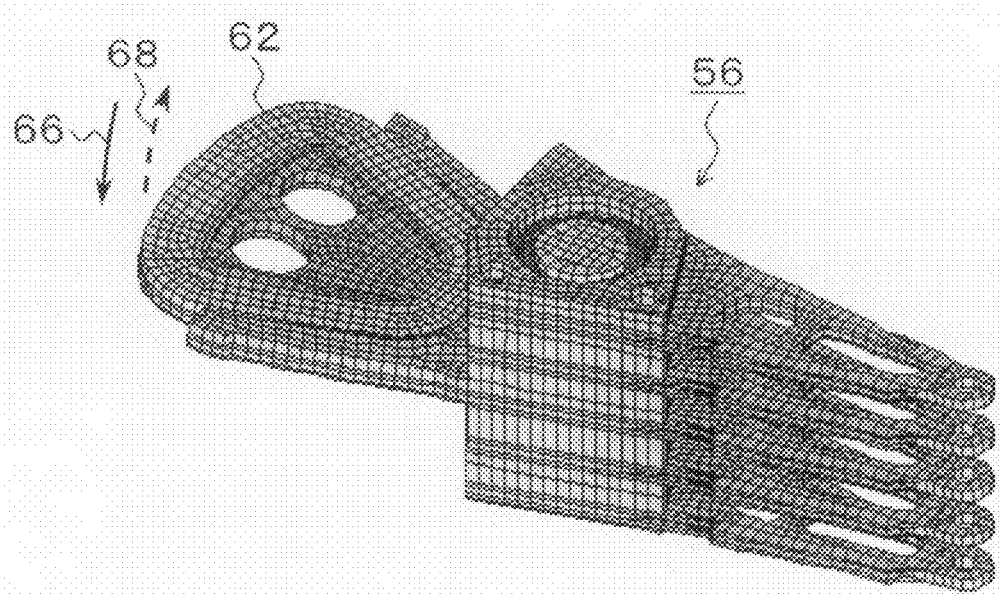
FIG. 5B
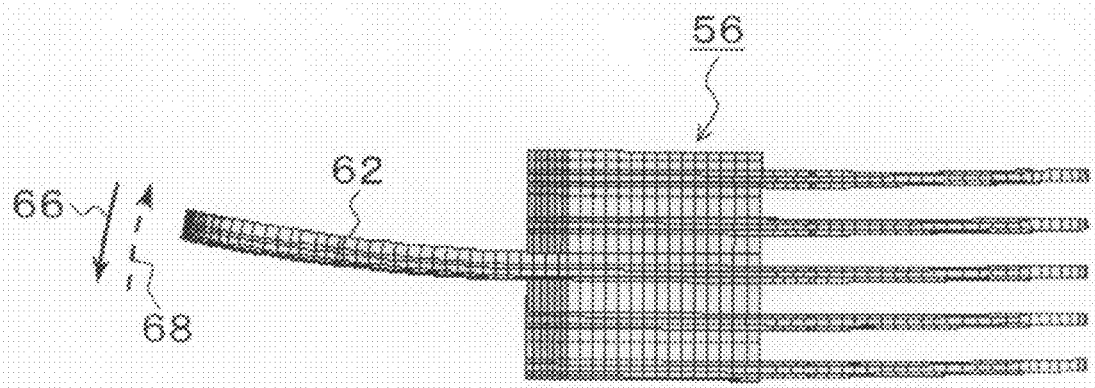

FIG. 6A
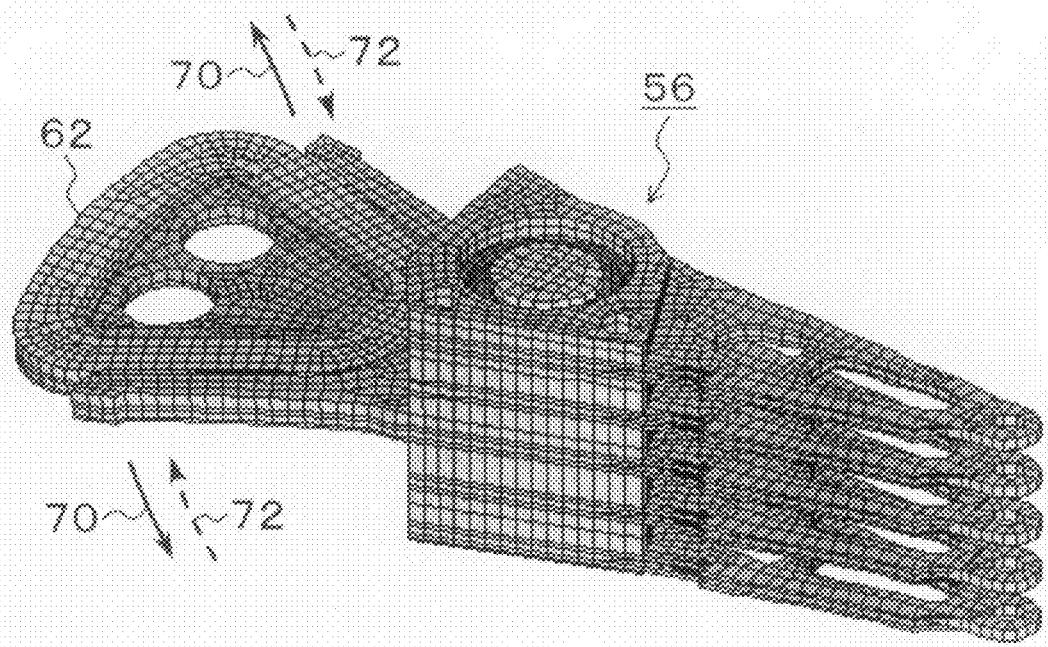
FIG. 6B
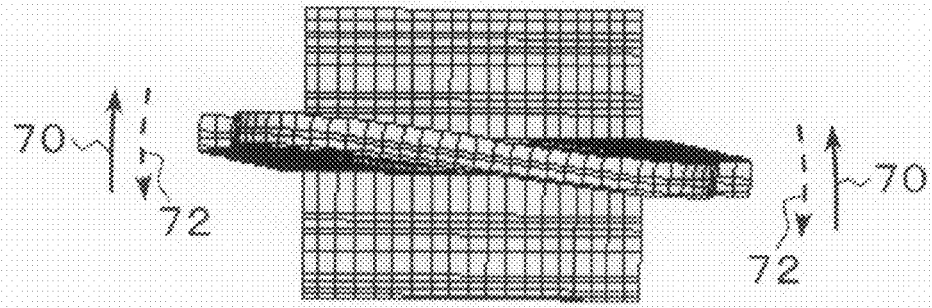

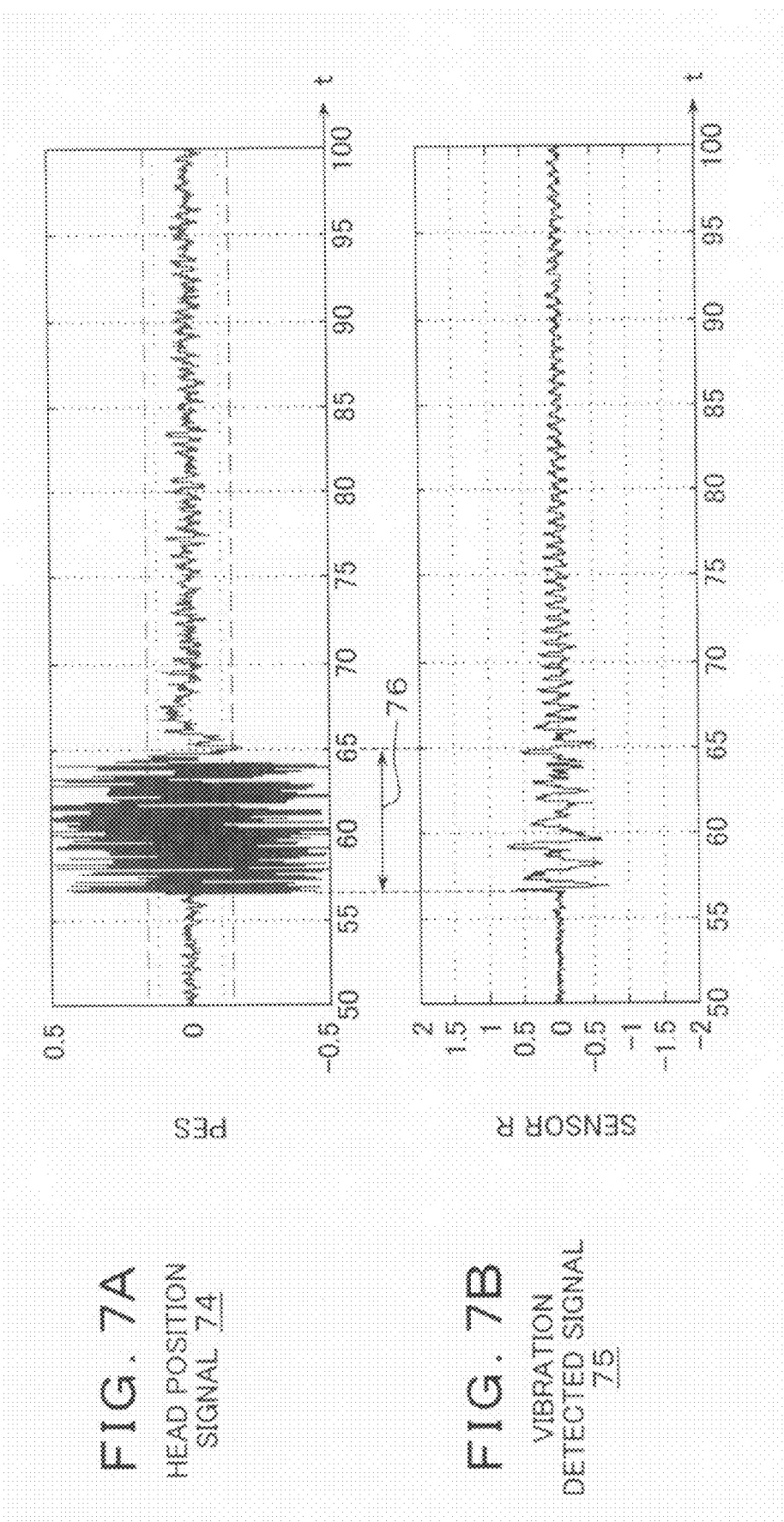

FIG. 8A
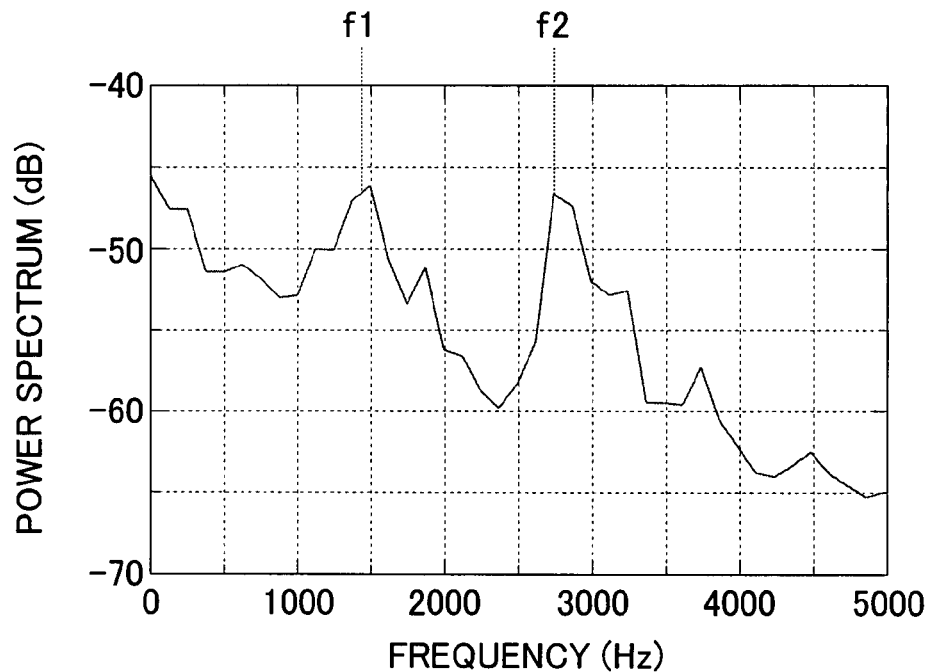
FIG. 8B
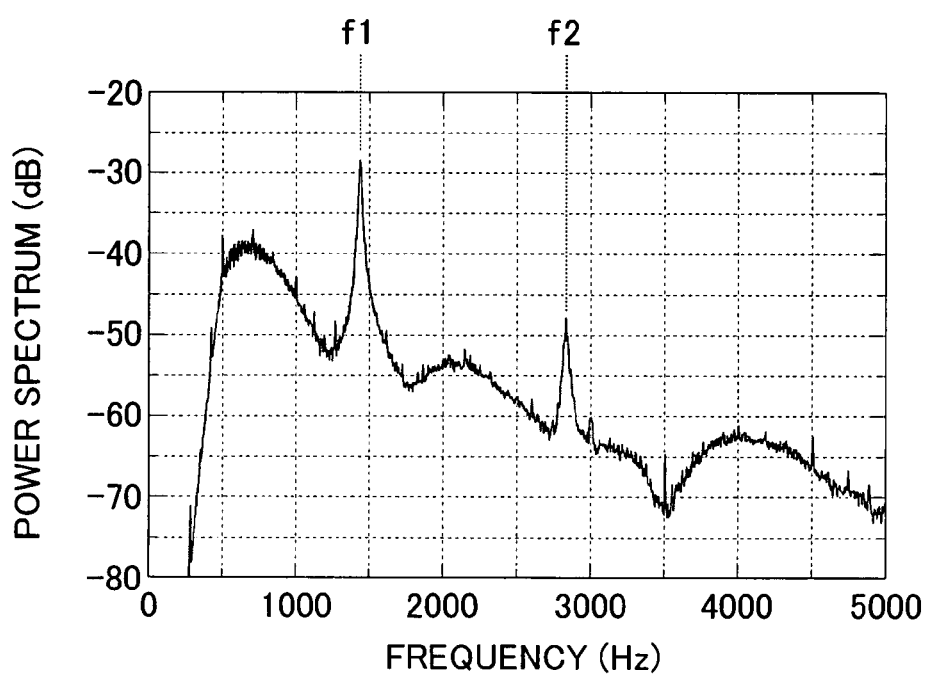

FIG. 9
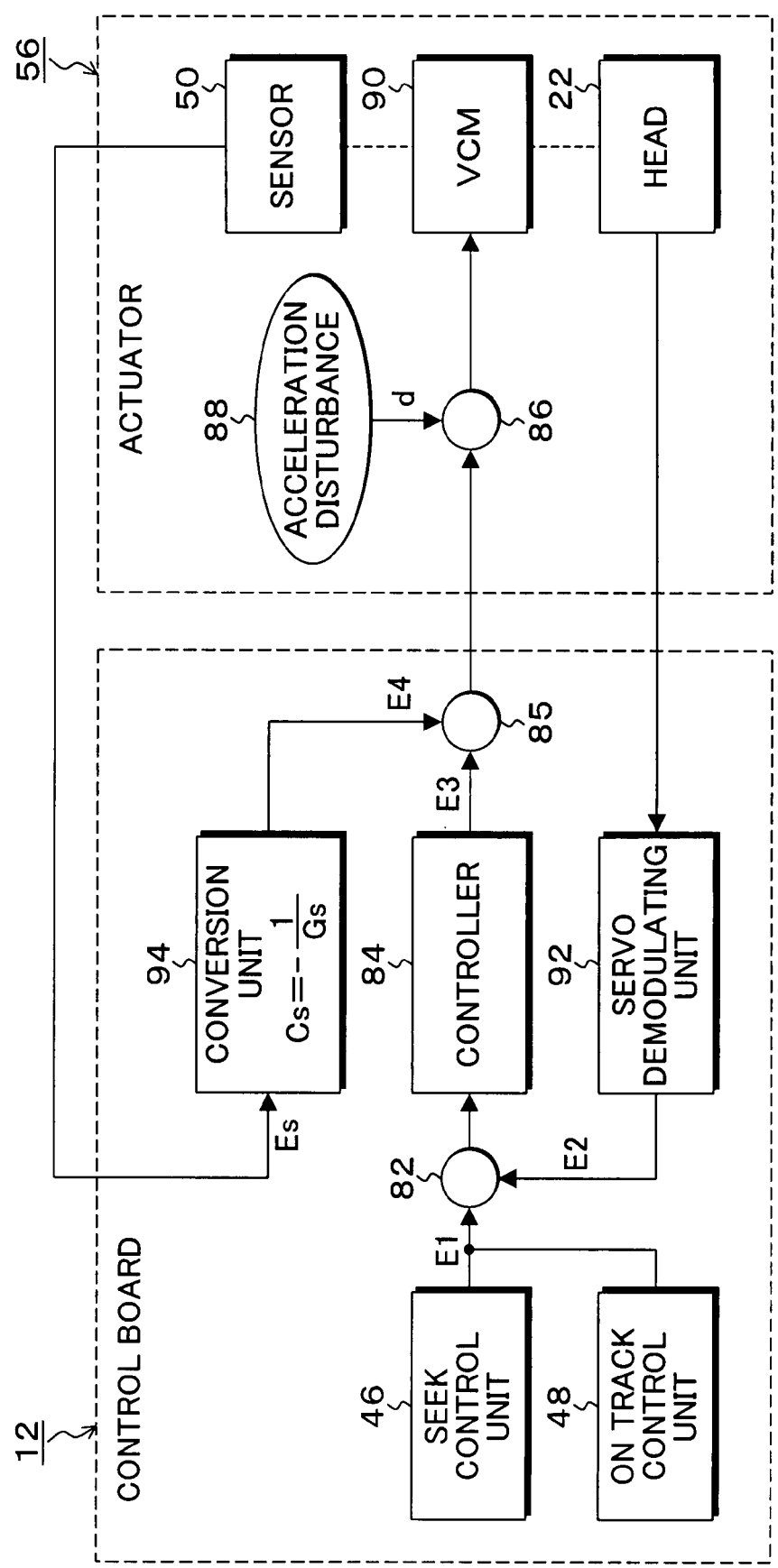

FIG. 10
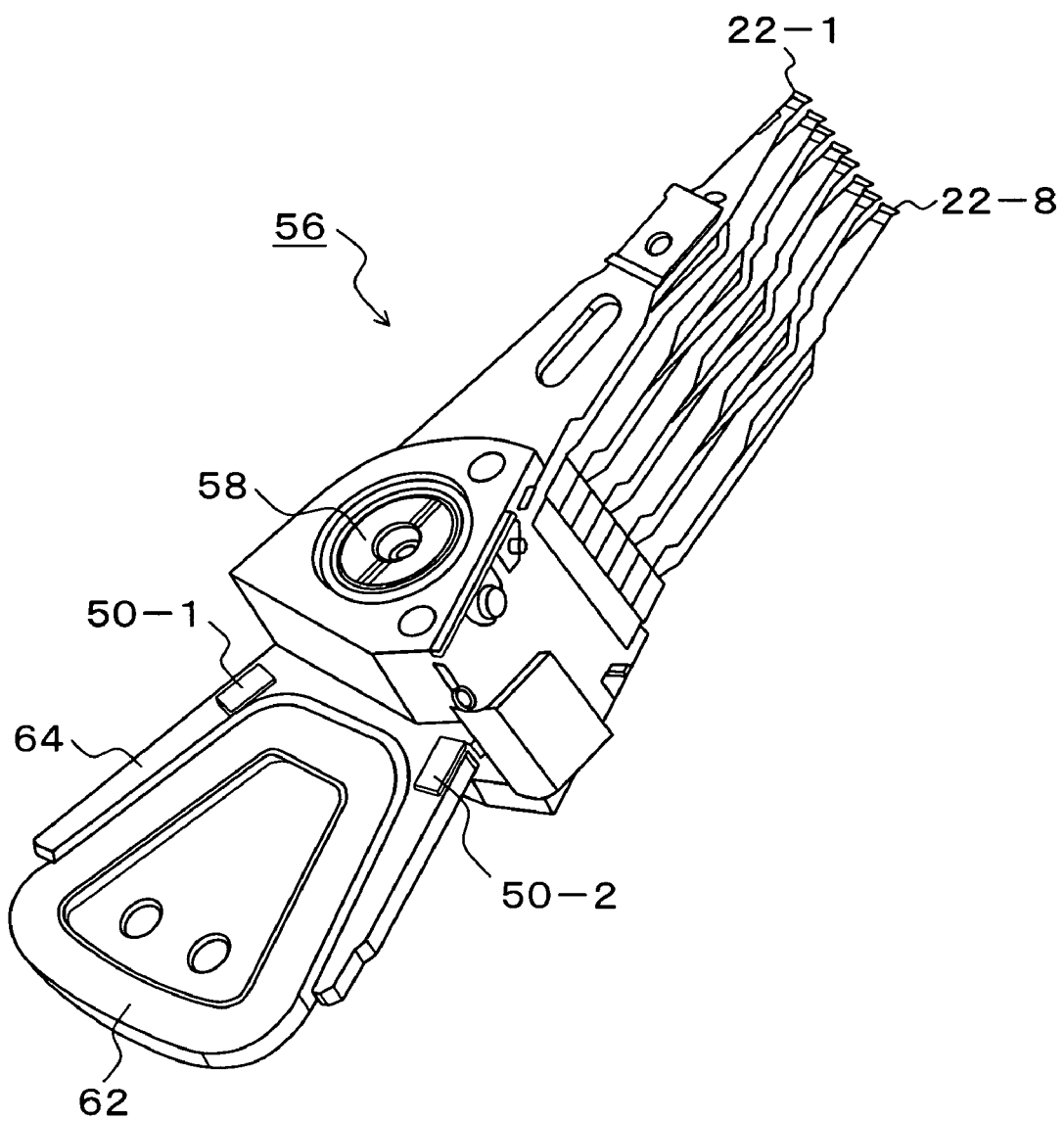

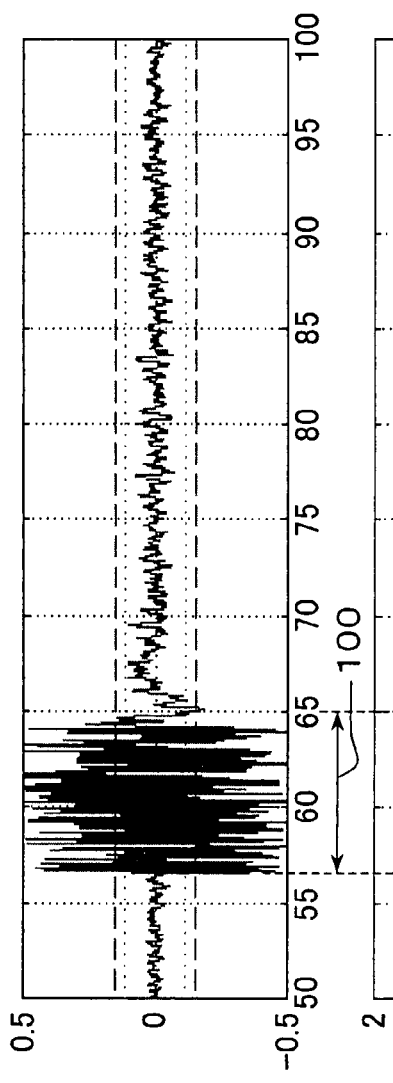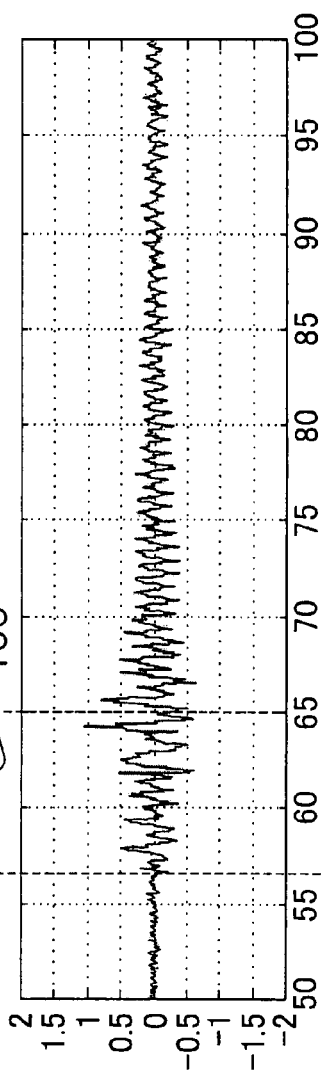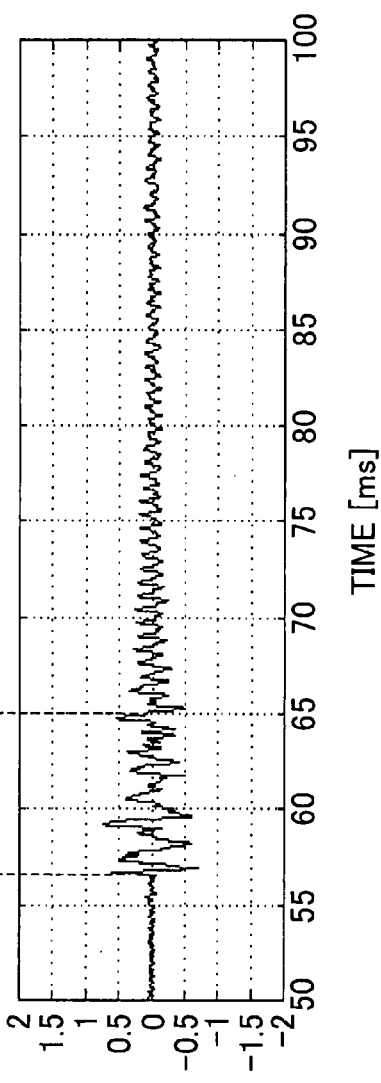
FIG. 11A
HEAD POSITION SIGNAL
96
FIG. 11B
SENSOR 50-1
VIBRATION DETECTED
SIGNAL 98-1
FIG. 11C
SENSOR 50-2
VIBRATION DETECTED
SIGNAL 98-2

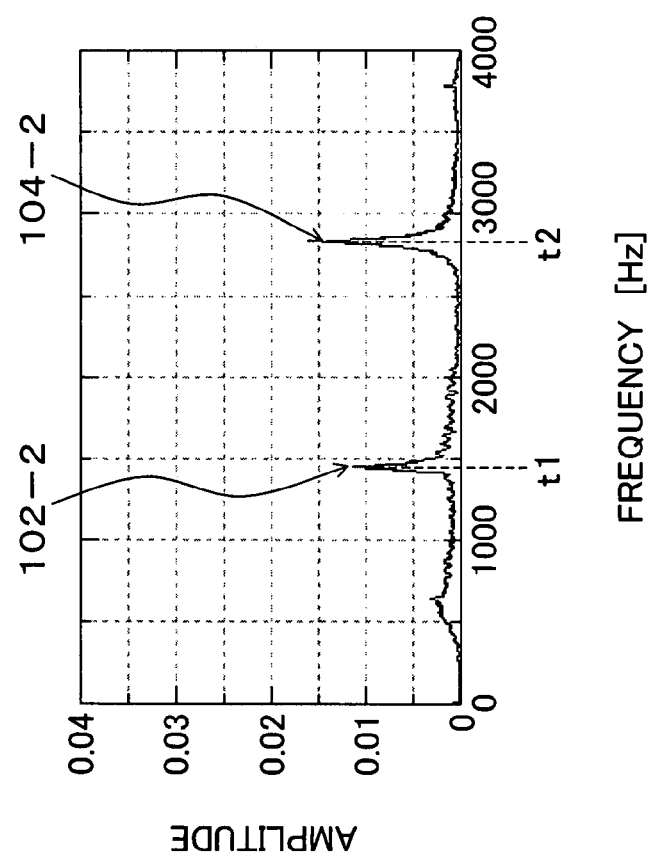
FIG. 12A
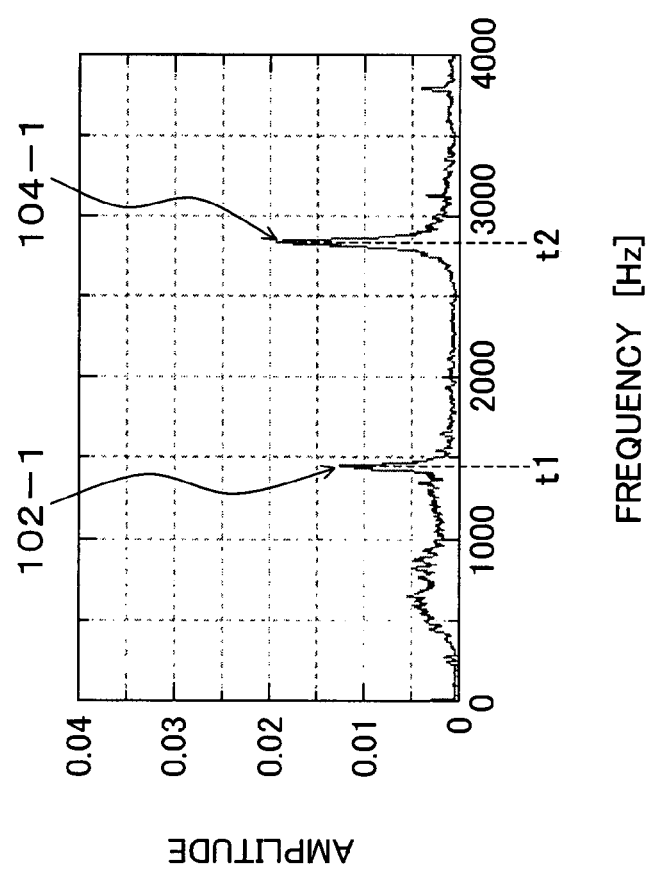
FIG. 12B

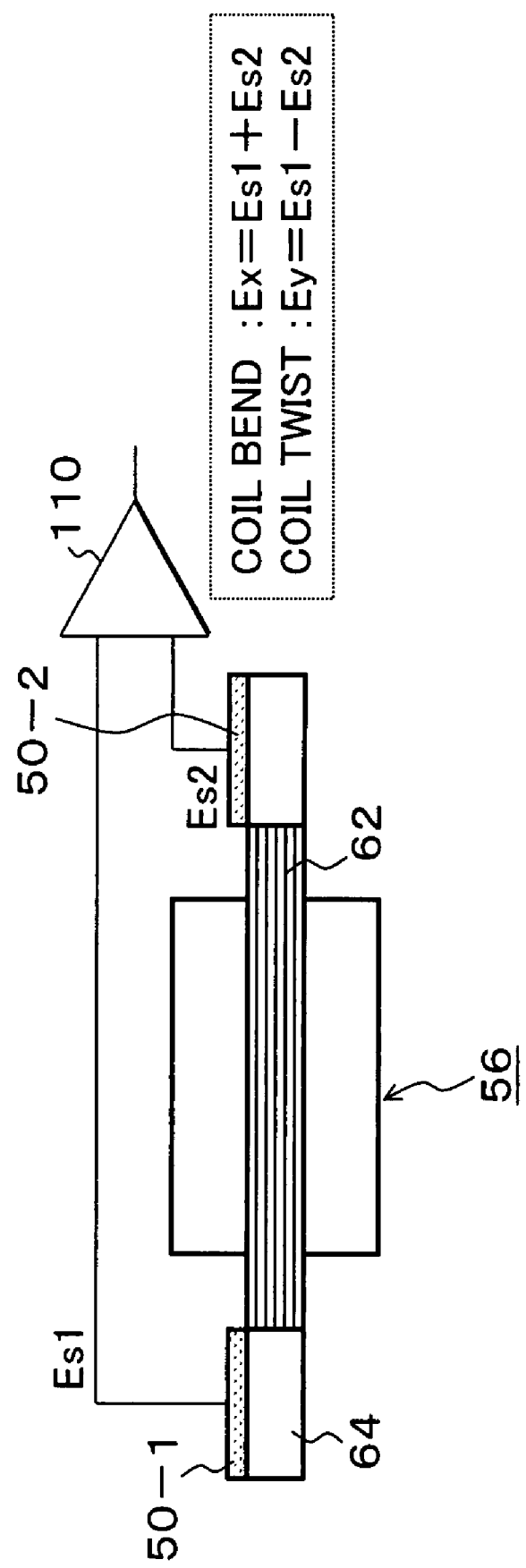

FIG. 14

| VIBRATION MODE | SENSOR 50-1 | SENSOR 50-2 |
|---|---|---|
| BENDING VIBRATION | + | + |
|  | − | − |
| TWISTING VIBRATION | + | − |
|  | − | + |

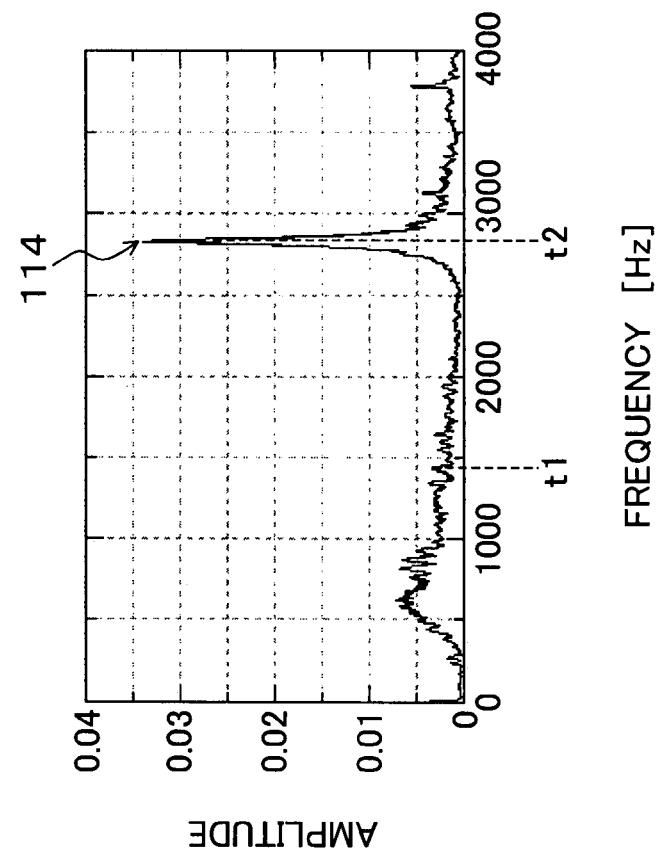
FIG. 15B
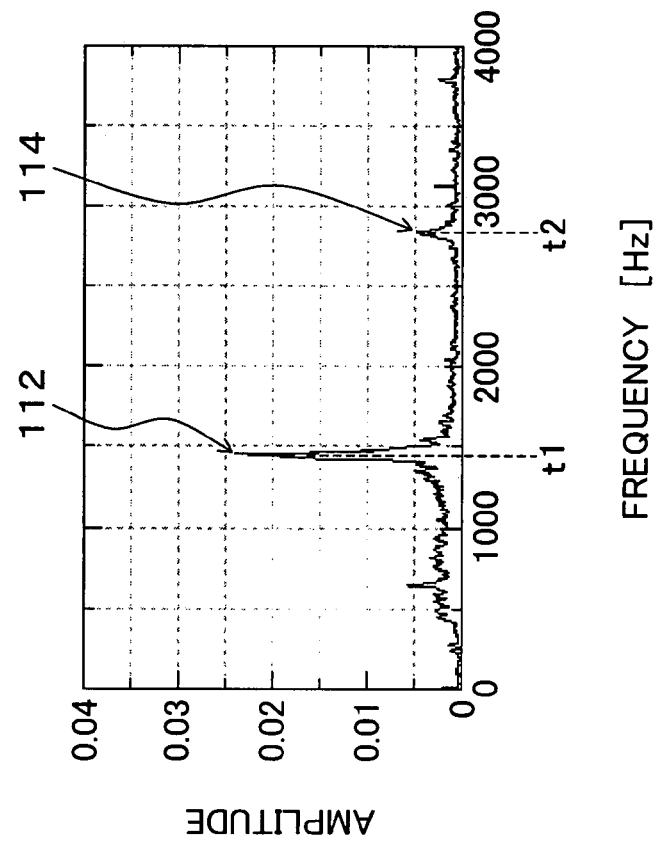
FIG. 15A

FIG. 16A
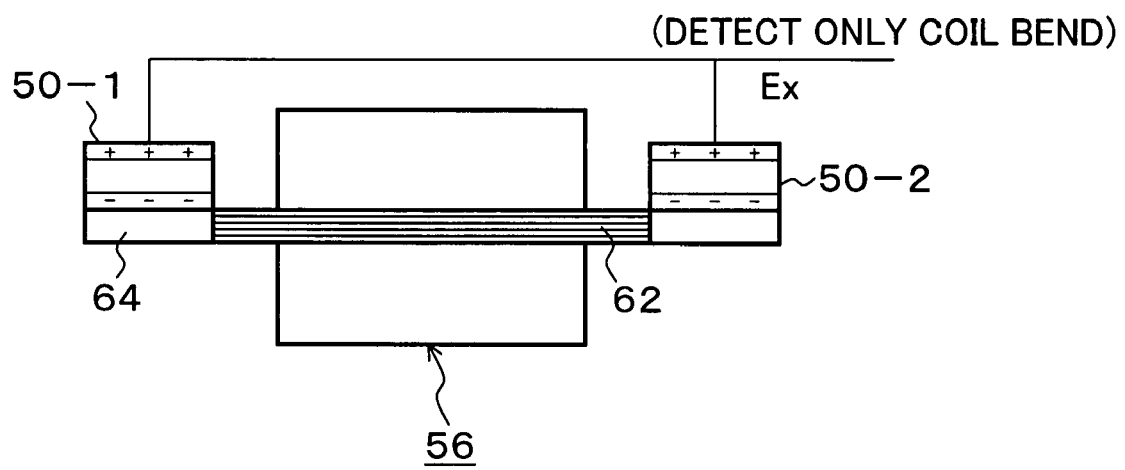
FIG. 16B
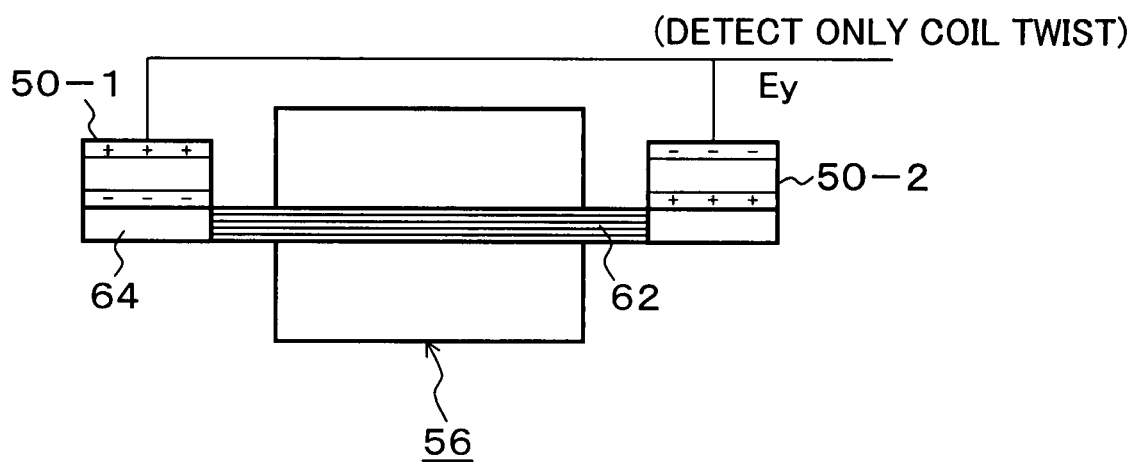

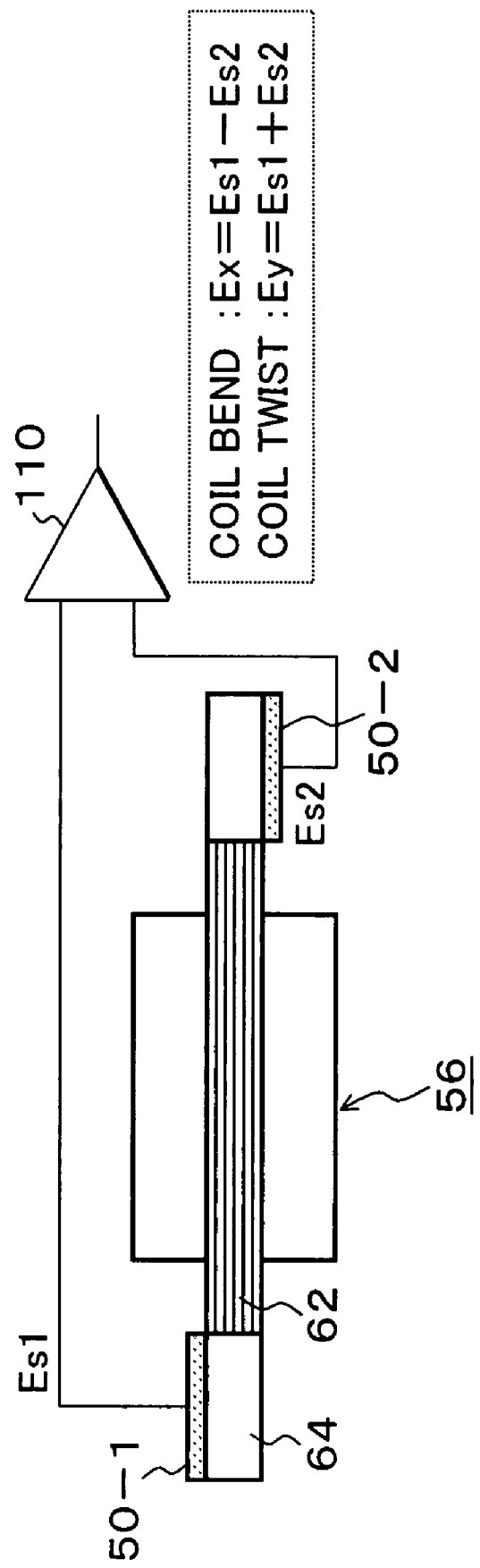

FIG. 18A
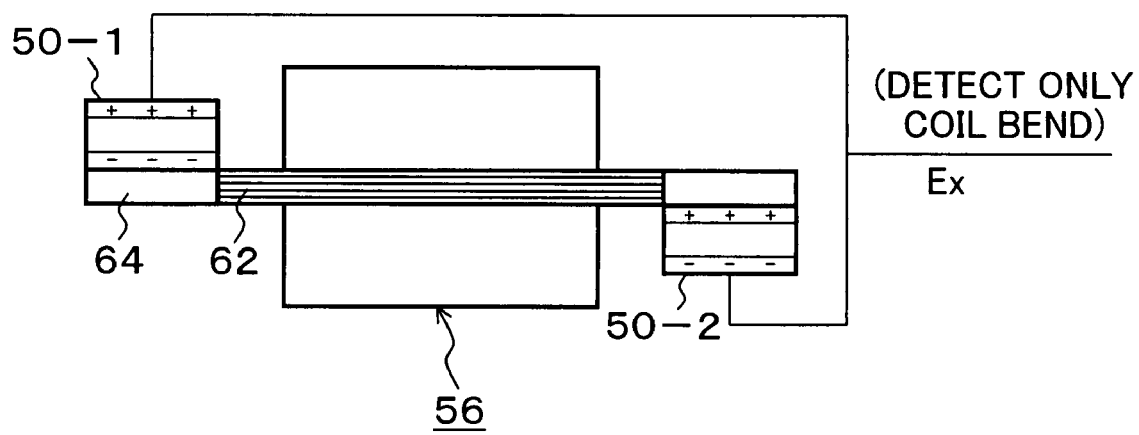
(DETECT ONLY COIL BEND)
Ex
FIG. 18B
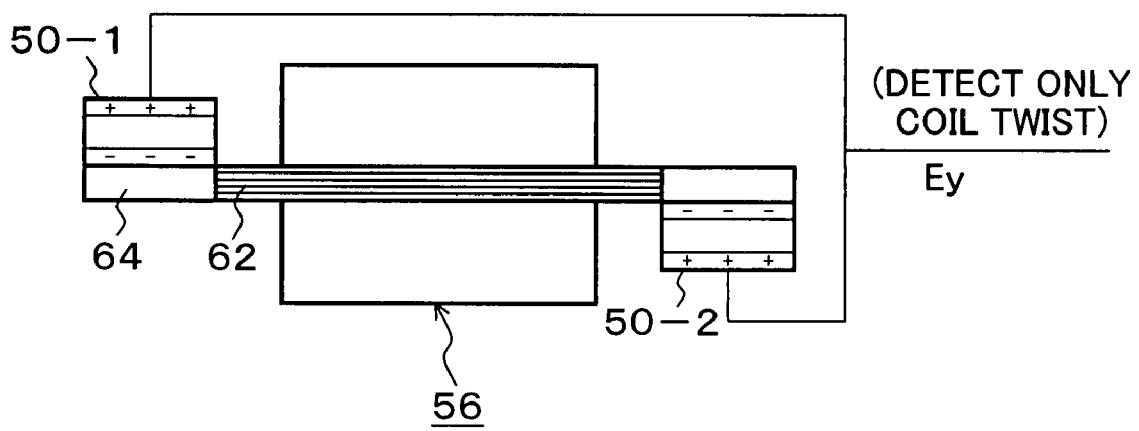
(DETECT ONLY COIL TWIST)
Ey

STORAGE APPARATUS AND CONTROL METHOD FOR DETECTING VIBRATION PRODUCED DURING SEEKING

This application is a priority based on prior application No. JP 2007-005506, filed Jan. 15, 2007, in Japan.

BACKGROUND OF THE INVENTION

1. Field of the Invention

The present invention relates to a storage apparatus and control methods for detecting coil vibration generated in time of actuator drive and performing a control such that a head position error signal reduces based on the vibration detected signal, in particular, to a storage apparatus and a control method for detecting coil vibration in time of seek for positioning the head at a target track and in time of settling, and performing a control such that the head position error signal reduces based on the vibration detected signal.

2. Description of the Related Arts

Conventionally, a rotary actuator is driven by a voice coil motor in the magnetic disk device to move the head to an arbitrary target track of a magnetic disk medium to write data to the target track or to read the data already written on the track. The voice coil motor for driving the actuator fixes a yoke that uses a permanent magnet to a housing, supports a head at one end of an actuator supported at a shaft unit in a freely rotating manner with respect to the housing, and supports the coil of the voice coil motor at the other end by a coil support unit. When moving the head to the arbitrary target track on the magnetic disk medium, the current is first flowed to the coil to perform seek control. The seek control performs speed control by producing the profile of the target speed corresponding to the remaining number of tracks until the target track, and normally, performs acceleration control, constant speed control, and deceleration control.

FIGS. 1A and 1B show a head position error signal and an on-track signal when positioning on the target track by seek control. FIG. 1A shows a head position error signal 200, where switch is made from speed control to position control when reaching the target track after the seek operation 202. When the head reaches an on-track slice level range 206, which is a range defined from the center of the target track, an on-track signal 208 shown in FIG. 1B is raised to H level and becomes valid. The drawing to a track center 210 from when seek is completed until the on-track signal 208 rises is referred as settling 204. Writing of data and reading of recorded data are performed only when the on-track signal 208 is at H level.

[Patent document 1] Japanese Patent Application Laid-Open Publication No. 11-317033

[Patent document 2] Japanese Patent Application Laid-Open Publication No. 11-203808

However, in such conventional magnetic disk device, vibration may produce in the actuator during seeking due to mechanical accuracy such as parallelism of the coil supported by the actuator and the yoke fixed and arranged on the housing side. The vibration produced in the actuator during seek is referred to as seek residual vibration, where if the seek residual vibration is produced, the period of settling 204 of FIG. 1A from seek completion until when the head reaches the on-track slice level of the target track and the on-track signal rises becomes long. After the head position error signal 200 enters the on-track slice level range 206, an off track 212 of moving outside the on-track slice level due to influence of seek residual vibration may occur, when the off track 212 occurs, the on-track signal 208 lowers to L level and writing or reading cannot be performed, and must wait until the head again moves into the on-track slice level range 206. Therefore, seek residual vibration leads to lowering of device performance. Patent document 1 has been proposed to control the actuator for detecting the vibration produced in the actuator with a sensor and suppressing the vibration. Patent document 1 performs a control to detect and suppress the vibration of a so-called butterfly mode caused by in-plane swing deformation of the coil during the on-track in which the head is positioned on the target track by seek control, thereby stabilizing the on-track control. However, the control of detecting and suppressing the vibration of the actuator by the sensor of patent document 1 is performed during on-track, and does not address the seek residual vibration produced during seeking, and furthermore, the vibration during seeking is not taken into consideration for the various vibration modes that occur in the actuator, and thus the problem of the settling period becoming long due to the seek residual vibration thereby lowering the device performance is not solved. In patent document 2, the sensor is not used, and the state amount of the vibration mode and the rigid body mode of the actuator are estimated and controlled from a head reproduction signal and a movement command control amount of the actuator. However, similar to patent document 1, patent document 2 proposes a control in on-track, and the problem of the settling time becoming long due to seek residual vibration thereby lowering the device performance is not solved.

SUMMARY OF THE INVENTION

According to the present invention to provide a storage apparatus and a control method for detecting the vibration produced during seeking, and reducing a head position error signal based on the vibration detected signal and reducing the time to move from seek completion to on-track, thereby enhancing the device performance.

The present invention provides a storage apparatus. The storage apparatus of the present invention includes, an actuator for supporting at least one head at one end of a rotatably supported shaft unit and supporting a coil of a voice coil motor on the other end, and moving the head to an arbitrary track position of at least one recording medium;

a plurality of sensors, attached to the actuator, for detecting coil vibration in time of actuator drive and outputting a vibration detected signal; and a control unit for drive controlling the actuator to reduce a head position error signal based on the vibration detected signal of the sensor in time of seek and/or in time of settling of moving the head to a target track position on the recording medium through drive of the actuator and drawing.

The sensor is attached to the coil support unit of the actuator. The vibration detected signal of the sensor includes bending vibration component of the coil and the twisting vibration component of the coil of when the actuator is driven.

The sensor is attached to at least two locations of the coil support unit of the actuator, and the vibration detected signals of the two sensors are additive synthesized and output to the control unit. In this case, the two sensors are attached on a same surface of the coil support unit. The sensors may be attached to opposite surfaces of the coil support unit of the two sensors.

The vibration detected signals of the two sensors include in phase bending vibration component and reversed phase twisting vibration component, and the vibration detected signals of the two sensors are additive synthesized in phase to output a vibration detected signal in which the twisting vibration component is reduced and the bending vibration component is emphasized.

The vibration detected signals of the two sensors include in phase bending vibration component and reversed phase twisting vibration component, and the vibration detected signals of the two sensors are additive synthesized at reversed phase to output a vibration detected signal in which the bending vibration component is reduced and the twisting vibration component is emphasized.

The vibration detected signals from the two sensors are input to an addition circuit to output an additive synthesized vibration detected signal. The output terminals of the two sensors are connected in parallel to output an additive synthesized vibration detected signal.

The sensor is a piezoelectric film sensor including polyvinylidene fluoride (PVDF).

(Method)

The present invention provides a control method of the storage apparatus. The present invention provides a control method of a storage apparatus including an actuator for supporting at least one head at one end of a rotatably supported shaft unit and supporting a coil of a voice coil motor on the other end, and moving the head to an arbitrary track position of at least one recording medium; the method including the steps of:

detecting coil vibration in time of actuator drive by a plurality of sensors attached to the actuator and outputting a vibration detected signal in time of seek or in time of settling of moving the head to a target track position on the recording medium through drive of the actuator and drawing; and driving the actuator to reduce a head position error signal based on the vibration detected signal of the sensor.

According to the present invention, the coil vibration in time of seek and in time of settling is detected by the sensor attached to the actuator, and the actuator is drive controlled such that the head position error signal is reduced based on the vibration detected signal, whereby the seek residual vibration by seek operation is reduced, the settling time from the completion of seek to the on-track slice level of the target track is reduced, the off track by the seek residual vibration after on-track is prevented, and the device performance is enhanced. The above and other objects, features, and advantages of the present invention will become more apparent from the following detailed description with reference to the drawings.

BRIEF DESCRIPTION OF THE DRAWINGS

FIGS. 1A and 1B are a time chart showing a head position signal and an on-track signal reaching an on-track through settling from a seek operation of a prior art;

FIG. 2 is a block diagram of a magnetic disk device showing one embodiment of a storage apparatus according to the present invention;

FIG. 3 is an explanatory view of the internal configuration of the present embodiment;

FIG. 4 is an explanatory view of attaching a sensor with respect to the actuator in the present embodiment;

FIGS. 5A and 5B are explanatory views of a coil bending vibration produced in the actuator of the present embodiment;

FIGS. 6A and 6B are explanatory views of a coil twisting vibration produced in the actuator of the present embodiment;

FIGS. 7A and 7B are time charts of an actual measured waveform of the head position signal and the vibration detected signal of the present embodiment;

FIGS. 8A and 8B are explanatory views showing frequency spectra of the head position error signal and the vibration detected signal of FIGS. 7A and 7B;

FIG. 9 is a block diagram showing a control system for reducing vibration according to the present embodiment;

FIG. 10 is an explanatory view showing an actuator of the present embodiment attached with two sensors;

FIGS. 11A to 11C are time charts showing an actually measured waveform of the head position signal and the vibration detected signals of the two sensors with respect to the embodiment of FIG. 10;

FIGS. 12A and 12B are explanatory views showing frequency spectra of the vibration detected signals of the sensors shown in FIGS. 11A to 11C;

FIG. 13 is an explanatory view showing an output of the vibration detected signal by additive synthesis of when two sensors are attached to the same surface of the coil support unit;

FIG. 14 is an explanatory view showing polarities of the vibration detected signals with respect to the vibration modes of when two sensors are attached;

FIGS. 15A and 15B are explanatory views showing frequency spectra of the bending vibration detected signal and he twisting vibration detected signal output in additive synthesis of FIG. 13;

FIGS. 16A and 16B are explanatory views showing the vibration detected signal obtained by additive synthesis through direct connection of the sensor outputs when two sensors are attached on the same surface of the coil support unit;

FIG. 17 is an explanatory view showing the vibration detected signal obtained by additive synthesis when two sensors are attached on opposite surfaces of the coil support unit; and FIGS. 18A and 18B are explanatory views showing the vibration detected signal obtained by additive synthesis through direct connection of the sensor outputs when two sensors are attached on opposite surfaces of the coil support unit.

DETAILED DESCRIPTION OF THE PREFERRED EMBODIMENTS

FIGS. 2A and 2B are block diagrams showing an embodiment of a magnetic disk device according to the present invention. In FIGS. 2A and 2B, a magnetic disk device 10 known as hard disk drive (HDD) is configured by a disk enclosure 14 and a control board 12. A spindle motor (SPM) 16 is arranged on the disk enclosure 14, and magnetic disks (recording media) 20-1, 20-2 are attached to a rotating shaft of the spindle motor 16 and rotated for a constant time at 4200 rpm, and the like. A voice coil motor (VCM) 18 is arranged on the disk enclosure 14, which voice coil motor 18 is mounted with heads 22-1 to 22-4 at an arm distal end of an actuator to position the heads with respect to the recording surfaces of the magnetic disks 20-1, 20-2. A recording element and a reading element are integrated and mounted on the head 22-1 to 22-4. The heads 22-1 to 22-4 are signal line connected to a head IC 24, and the head IC 24 selects one head with a head select signal based on a write command or a read command from a host for a device of higher level to perform write or read. A write amplifier is arranged for the write system and a preamplifier is arranged for the read system in the head IC 24. An MPU 26 is arranged on the control board 12, and a memory 30 for storing control program and control data using RAM, a non-volatile memory 32 for storing control program using FROM etc. are arranged with respect to a bus 28 of the MPU 26. A host interface control unit 34, a buffer memory control unit 36 for controlling a buffer memory 38, a hard disk controller 40, a read channel 42 serving as a write modulation unit and a read demodulation unit, and a driving unit 44 for controlling the voice coil motor 18 and the spindle motor 16 are arranged on the bus 28 of the MPU 26. The MPU 26, the memory 30, the host interface control unit 34, the buffer memory control unit 36, the hard disk controller 40, and the read channel 42 on the control board 12 may be configured as one control device 15, specifically, the control device 15 may be configured as one LSI device. The magnetic disk device 10 performs writing process and reading process based on a command from the host. The normal operation in the magnetic disk device is as described below. When write command and write data from the host are received by the host interface control unit 34, the write command is deciphered in the MPU 26, and after the received write data is stored in the buffer memory 38, as necessary, the data is converted to a predetermined data format in the hard disk controller 40 and added with an ECC code through ECC process, and then scrambled, RLL code converted, and furthermore write compensated in the write modulation system in the read channel 42, and thereafter, written to the magnetic disk 20 from the recording element of the head 22-1, for example, selected via the head IC 24 from the write amplifier. A head positioning signal is provided from the seek control unit 46 of the MPU 26 to the driving unit 44 including VCM motor driver etc., the head is directed towards the target track instructed in the command by the voice coil motor 18, and a speed profile of target speed (target speed pattern of acceleration, low-speed, deceleration) corresponding to the number of remaining tracks is generated and speed control is performed. When the target track is reached, switch is made from speed control to position control by the on-track control unit 48, a settling of drawing the track center of the target track is performed, the on-track signal rises when in a predetermined on-track slice level range, and read or write is executed while maintaining an on-track state by the on-track control of controlling the head position in the on-track slice level range. When the read command from the host is received by the host interface control unit 34, the read command is deciphered in the MPU 26, and after the read signal read by the reading element of the head 22-1 selected by the head selector of the head IC 24 is amplified with the pre-amplifier, the signal is input to the read demodulation system of the read channel 42, the read data is demodulated by partial response maximum-likelihood detection (PRML) etc., subjected to ECC process in the hard disk controller 40 to detect and correct the error, and thereafter, buffered in the buffer memory 38, and the read data is transferred from the host interface control unit 34 to the host.

FIG. 3 is an explanatory view of the internal configuration of the magnetic disk device according to the present embodiment. In FIG. 3, the magnetic disk device of the present embodiment includes magnetic disks 20-1, 20-2, 20-3, 20-4 that rotate at a constant speed by the spindle motor 16 arranged on the base 54. In FIGS. 2A and 2B, a case in which two magnetic disks 20-1, 20-2 are arranged on the disk enclosure has been described, but the magnetic disk device of the present embodiment can be manufactured with the number of magnetic disks changed as necessary, and a case in which four magnetic disks are arranged is given by way of example in FIG. 3. An actuator 56 rotatably supported by a shaft unit 58 is arranged with respect to the magnetic disks 20-1 to 20-3. The actuator 56 supports the head 22-1 at the distal end of the arm, and the coil on the other side attached with the permanent magnet fixed to the base 54 and movably arranged between the yokes 60 arranged above and below.

FIG. 4 is an explanatory view of attaching a sensor with respect to the actuator in the present embodiment. In FIGS. 5A and 5B, the actuator 56 of the present embodiment has the arm extended to one end of the shaft unit 58, and supports the heads 22-1 to 22-8 by way of a gimbal configuring the spring plate. The actuator 56 is used for the four magnetic disks 20-1 to 20-4 shown in FIG. 3, and thus corresponds to two recording surfaces on the front and the back per one magnetic disk, and supports eight heads 22-1 to 22-8. A coil 62 is supported by a coil support unit 64 opened to a substantially U-shape on the opposite side of the shaft unit 58 of the actuator 56. The coil 62 is positioned at the upper and lower gap portions of the yoke 60 shown in FIG. 3 and configures the voice coil motor (VCM) 18 with the yoke 60 side as the fixed magnetic pole and the coil 62 as the movable coil, where the head moves to an arbitrary track position on the medium surface of the magnetic disk 20-1 as shown in FIG. 3 with the shaft unit 58 as the center by flowing current to the coil 62. In such actuator 56 of the present embodiment, a sensor 50 for detecting the vibration is attached at the root on the shaft unit 58 side of the coil support unit 64 to detect the coil vibration of when current is flowed to the coil 62 and the voice coil motor is driven. A PVDF (polyvinylidene fluoride) sensor known as piezoelectric polymer sensor is used for the sensor 50. The sensor 50 using PVDF outputs a detected signal corresponding to the distortion involved in the vibration produced in time of current flow to the coil 62 as vibration detected signal.

FIGS. 5A to 6B are explanatory views of a coil vibration mode produced in the actuator of the present embodiment. The coil vibration produced when seek control is performed by flowing current to the coil 62 of the actuator 56 includes two types of coil bending vibration of FIGS. 5A and 5B and coil twisting vibration of FIGS. 6A and 6B The coil bending vibration of FIGS. 5A and 5B are the vibration of coil bending mode in which the coil 62 swings up and down as shown with arrows 66, 68 due to variation in dimension of the magnetic circuit formed by the yoke on the fixed magnetic pole side when current is flowed to the coil 62 supported by the coil support unit 64 of the actuator 56. The coil twisting vibration of FIGS. 6A and 6B are the vibration of the twist mode in which the right side of the coil, for example, moves clockwise as shown with arrow 70 and then moves counterclockwise as shown with arrow 72 when current is flowed to the coil 62. The coil bending vibration and the coil twisting vibration of FIGS. 5A to 6B are vibrations produced by change in driving force involved in a slight fluctuation of the magnetic gap with the yoke when the coil 62 side moves with respect to the fixed magnetic pole of the yokes 60 from current flow to the coil 62 arranged between the yoke 60 shown in FIG. 3, and such coil vibration is transmitted to the actuator 56 and becomes a seek residual vibration thereby vibrating the head of the arm distal end.

FIGS. 7A and 7B are time charts of an actual measured waveform of the head position error signal and the vibration detected signal by the sensor when the actuator of the present embodiment is seek controlled.

FIG. 7A is a head position error signal 74 which is a signal demodulated through reading of burst signal of the servo region formed at a constant angular interval in the radial direction of the magnetic disk. When the seek operation 76 is terminated, settling of drawing in the target track is performed, and the vibration of the signal waveform gradually comes to a rest after seek is completed thereby transitioning to the on-track state.

FIG. 7B is a vibration detected signal 75 detected in the sensor 50, where the amplitude increases immediately after the start of seek and the vibration gradually attenuates at the completion of seek as apparent from the waveform corresponding to the seek operation 76.

FIG. 8A shows a frequency spectrum calculated from the head position error signal 74 of FIG. 7A, and FIG. 8B shows a frequency spectrum calculated from the vibration detected signal 75 of the sensor of FIG. 7B. The frequency spectrum of the vibration detected signal of FIG. 8B has two vibration peaks. The peak near frequency f1=about 1.4 KHz of the vibration peaks is the bending vibration component 78. The vibration having the peak near frequency f2=2.8 KHz is the twisting vibration component 80. The two vibrations also appear on the frequency spectrum of the head position error signal of FIG. 8A. The coil bending vibration and the coil twisting vibration are transmitted to the head, thereby affecting the head position error signal.

FIG. 9 is a block diagram showing a control system for reducing seek residual vibration according to the present embodiment. In FIG. 9, a seek control unit 46, and an on-track control unit 48 are arranged on the control board 12 side, and the respective target control signal E1 is output to an adder 82. In seek control, the seek control unit 46 first outputs the target control signal E1 of target speed corresponding to the remaining number of tracks with respect to the target track to the adder 82. After seek is completed, the switch is made to the target position signal E1 indicating the track center from the on-track control unit 48. With respect to the adder 82, the servo reading signal from the head 20 driven by the VCM arranged on the actuator 56 side is demodulated as the head position signal by the servo demodulating unit 92, where the signal is fed back to the adder 82 as speed signal E2 through differentiation and the like of the head position signal in seek control, and fed back to the adder 82 as head position signal E2 in on-track control. The adder 82 outputs the speed error signal in seek control and the position error signal in on-track control to a controller 84. The controller 84 outputs a control signal E3 corresponding to speed deviation or position deviation through computation process including proportion, integration, and differentiation, flows driving current to the VCM 90 via the adders 85, 86, and performs seek control or on-track control. The vibration produced in current flow to the coil 62 of the actuator 56 in seek control is considered as acceleration disturbance 88, where disturbance component d of such acceleration disturbance 88 is added to the control system by the adder 86. In the present embodiment, the coil vibration produced by seeking of the actuator 56 is detected, a vibration detected signal Es from the sensor 50 is input to the conversion unit 94, and a conversion signal E4 is generated and added to the adder 85, so that the disturbance component d added as the acceleration disturbance 88 to the adder 86 is canceled out by the conversion signal E4. Assuming the transfer function until the vibration detected signal Es of the sensor 50 is obtained from the disturbance component d of the acceleration disturbance 88 added to the adder 86 is Gs (=Es/d), the conversion unit 94 adds the conversion signal E4 calculated from the vibration detected signal Es of the sensor 50 and the transfer function Cs (=−1/Gs) to the control system by the adder 85, where the inverse transfer function −1/Gs of the transfer function Gs is transfer function Cs. Since E4=−d, the influence of the disturbance component d by the acceleration disturbance 88 can be canceled out by adding the conversion signal E4 from the conversion unit 94. In the correspondence relationship of FIGS. 2A and 2B of the control board 12 shown in FIG. 9, units other than the servo demodulating unit 92 are functions executed in program control of the MPU 26, the servo demodulating unit 92 is a function of the read channel 42, and the function of the conversion unit 94 for converting the vibration detected signal from the sensor 50 newly arranged in the present embodiment is realized as the function of the MPU 26. By canceling out the disturbance component with the coil vibration by adding the converted signal converted from the vibration detected signal of the coil detected by the sensor 50 of FIG. 9 to the control system, the seek residual vibration produced in the head in time of seek and in time of settling of drawing in the target track is reduced, the time from the completion of seek at which the target track is reached until settling at when in the on-track slice level range set at a constant width respect to the track center of the target track and the on-track signal rises is reduced, and furthermore, generation of off track by residual vibration after the on-track signal rises is reliably prevented.

FIG. 10 is an explanatory view showing an actuator of the present embodiment attached with two sensors for detecting coil vibration. In FIG. 10, sensors 50-1, 50-2 using PVDM sensor etc. are attached in a distributed manner at two locations at the root of the coil support unit 64 for supporting the coil 62 of the actuator 56.

FIGS. 11A to 11C are time charts showing an actually measured waveform of the head position error signal and the vibration detected signals of the two sensors 50-1, 50-2 when the actuator 56 of FIG. 10 is used.

FIG. 11A is the head position error signal 96. The signal amplitude gradually comes to a rest at the completion of seek and transitions to the on-track state by performing settling of drawing the target track when the seek operation 100 is terminated.

FIG. 11B is a vibration detected signal 98-1 of the sensor 50-1 of FIG. 10, and FIG. 11C is the vibration detected signal 98-2 of the sensor 50-2 of FIG. 9. The vibration detected signals 98-1, 98-2 of the sensors 50-1, 50-2 both have the amplitude increasing at the start of seek corresponding to the period of the seek operation 100, and the vibration gradually comes to a rest at the completion of seek, where both signals show substantially the same waveform change.

FIGS. 12A and 12B show frequency spectra of the vibration detected signals 98-1, 98-2, of the sensors 50-1, 50-2 of FIGS. 11B and 11C.

FIG. 12A is a frequency spectrum of the sensor 50-1, where the bending vibration component 102-1 having a peak near frequency f1=1.4 KHz and the twisting vibration component 104-1 having a peak near frequency f2=2.8 KHZ appeared.

FIG. 12B is a frequency spectrum of the sensor 50-2, and similarly, the bending vibration component 102-2 having a peak near frequency f1=1.4 KHz and the twisting vibration component 104-2 having a peak near frequency f2=2.8 KHz appeared.

FIG. 13 is an explanatory view showing an output of the vibration detected signal by additive synthesis of an addition circuit 110 of when two sensors are attached to the same surface of the coil support unit. An attachment state of the two sensors 50-1, 50-2 with respect to the actuator 56 is shown, where the sensors 50-1, 50-2 are attached to the same surface of the coil support unit 64 supporting the coil 62. The polarities of the vibration detected signals with respect to the bending vibration and the twisting vibration of the sensors 50-1, 50-2 are as shown in FIG. 14.

In FIG. 14, when the vibration mode is bending vibration, extending deformation and contracting deformation simultaneously occur at the sensors 50-1, 50-2. and thus the vibration detected signals become in-phase vibration detected signal where if one is positive polarity, the other is positive polarity, and if one is negative polarity, the other is negative polarity. On the other hand, when the vibration mode is twisting vibration, if one of the sensors 50-1, 50-2 is extending deformed, the other is contracting deformed, and thus the vibration detected signals become reversed phase vibration detected signal where if one is positive polarity, the other is negative polarity, and if one is negative polarity, the other is positive polarity. A vibration detecting circuit for separately extracting the bending vibration component and the twisting vibration component using the signal polarities with respect to bending vibration and twisting vibration of the sensors 50-1, 50-2 is configured.

In FIG. 13, a circuit configuration is obtained in which the vibration detected signal where the bending vibration component is emphasized and the twisting vibration component is canceled out is output by adding the vibration detected signals (Es1+Es2) of the sensor 50-1 and the sensor 50-2, whereas the vibration detected signal in which the twisting vibration component is emphasized and the bending vibration component is canceled out is output by taking the difference of the vibration detected signals (Es1−Es2) of the sensor 50-1 and the sensor 50-2. The frequency spectra of the sensors 50-1, 50-2 respectively contain bending vibration component 102-1, 102-2, and twisting vibration component 104-1, 104-2, as shown in FIGS. 12A and 12B. As a result, the vibration detected signal Ex in which the vibration detected signals of the sensor 50-1 and the sensor 50-2 of FIG. 13 are added (Es1+Es2) has a frequency spectrum shown in FIG. 15A. Regarding the frequency spectrum serving as the vibration detected signal Ex of FIG. 15A, the bending vibration component 112 having a peak near frequency f1=1.4 KHz increases through addition process, and the twisting vibration component 114 having a peak near frequency f2=2.8 KHz greatly attenuates due to cancellation by reversed phases. The vibration detected signal Ey in which the difference (Es1−Es2) of the vibration detected signals of the sensor 50-1 and the sensor 50-2 of FIG. 13 is taken has the frequency spectrum shown in FIG. 15B. Regarding the twisting vibration detected signal Ey, the bending vibration component near frequency f1=1.4 KHz is mostly eliminated due to cancellation, and the twisting vibration component 114 having a peak near frequency f2=−2.8 KHz is emphasized by taking the difference of the two sensors. Therefore, when two sensors 50-1, 50-2 are arranged on the actuator 56, the bending vibration component Ex or the twisting vibration component Ey is obtained depending on whether to perform addition process by addition circuit or to take the difference, where one vibration that is more influenced by the seek residual vibration of the actuator involved in coil vibration is input to the conversion unit 94 shown in FIG. 9 to selectively cancel out the disturbance by the bending vibration component or the twisting vibration component. The bending vibration detected signal Ex and the twisting vibration detected signal Ey detected in FIG. 13 are respectively input to different conversion units and converted, and thereafter, written to the control system as signals that cancel out acceleration disturbance by the respective vibration to perform a control of canceling out the vibration for every vibration mode.

FIGS. 16A and 16B are explanatory views of an output circuit of the vibration detected signal additive synthesized through direct connection of the sensors when two sensors 50-1, 50-2 are attached on the same surface of the coil support unit 64 as in FIG. 13.

FIG. 16A shows a case of outputting the bending vibration detected signal Ex, where the sensors 50-1, 50-2 are attached to the coil support unit such that the electrodes are facing the same direction and connected in parallel. That is, the positive electrodes 106-2, 106-2 of the sensors 50-1, 50-2 are connected in parallel, and the bending vibration detected signal Ex is output from the parallel connected line.

FIG. 16B is a case of detecting the twisting vibration detected signal Ey by direct connection of the sensors 50-1, 50-2. Since the sensors are directly connected and the difference thereof cannot be taken, the direction of the electrodes of one sensor is reversed. That is, the positive electrode 106-1 of the sensor 50-1 and the negative electrode 108-2 of the sensor 50-2 are parallel connected, so that the twisting vibration detected signal Ey is retrieved.

FIG. 17 is an explanatory view showing an output of the vibration detected signal by additive synthesis of when two sensors are attached on opposite surfaces of the coil support unit. The attachment state of the two sensors with respect to the coil support unit 64 of the actuator 56 is shown, where one sensor 50-1 is attached to the upper unit of the coil support unit 64 and the other sensor 50-2 is attached to the lower unit of the coil support unit 64. Even if the sensors 50-1, 50-2 are attached at two locations of the coil support unit 64, the bending vibration detected signal Ex can be output by taking the difference (Es1−Es2) of the vibration detected signals of the two sensors 50-1, 50-2. The twisting vibration detected signal Ey can be output by adding (Es1+Es2) the vibration detected signals of the sensors 50-1, 50-2.

FIGS. 18A and 18B show output circuits of the vibration detected signals additive synthesized through direct connection of the sensors when the sensors 50-1, 50-2 are attached to the upper unit and the lower unit at two locations with respect to the coil support unit 64 as shown FIG. 17. Only the bending vibration detected signal Ex is output or only the twisting vibration detected signal Ey is output by changing the direction of the electrodes of the sensors when being attached to the coil support unit.

FIG. 18A shows a case of outputting the bending vibration detected signal Ex. FIG. 18B shows a case of outputting the twisting vibration detected signal Ey. In the present embodiment, a case of arranging the sensor at one location or two locations at the root of the coil support unit 64 of the actuator has been described, but three or more sensors may be arranged as necessary. The attachment position of the sensor in the coil support unit 64 is desirably a position of the coil support unit at where the stress concentrates by coil vibration, specifically, a position near the root of the shaft unit 58 in the coil support unit 64 shown in FIGS. 4 and 10 is the optimum position. The PVDF sensor, which is one type of piezoelectric film sensor, is given by way of example of the sensor used in the present embodiment, but an appropriate sensor for vibration detection can be used as long as it is a sensor that is easy to attach and that does not present problems in terms of space. A case of performing a control to reduce the seek residual vibration by adding the cancellation signal based on the sensor detected signal to the control system in time of seek and in time of settling has been described in the above embodiments, but a control of cancelling the vibration only during the seek control or a control of cancelling the seek residual vibration only in time of settling may be performed. Furthermore, although the coil vibration basically does not occur during on-track as in time of seek, vibration is sometimes applied to the actuator by disturbance and the like, and thus, stability during the on-track control can be enhanced by validating the cancellation control based on the vibration detected signals of the sensors according to the present embodiment even during the on-track. The present invention also includes appropriate modification without departing from the aim and the effects thereof, and should not be limited by the numerical values indicated in the embodiments.

What is claimed is:

1. A storage apparatus including:
   an actuator for supporting at least one head at one end of a rotatably supported shaft unit and supporting a coil of a voice coil motor on the other end, and moving the head to an arbitrary track position of at least one recording medium;
   a plurality of sensors, attached to the actuator, for detecting coil vibration in time of actuator drive and outputting a vibration detected signal; and
   a control unit for drive controlling the actuator to reduce a head position error signal based on the vibration detected signal of the sensor in time of seek or in time of settling of moving the head to a target track position on the recording medium through drive of the actuator and drawing.

2. The storage apparatus according to claim 1, wherein the sensor is attached to a coil support unit of the actuator.

3. The storage apparatus according to claim 1, wherein the vibration detected signal of the sensor includes bending vibration component of the coil and twisting vibration component of the coil of when the actuator is driven.

4. The storage apparatus according to claim 1, wherein the sensor is attached to at least two locations of a coil support unit of the actuator, and vibration detected signals of the two sensors are additive synthesized and output to the control unit.

5. The storage apparatus according to claim 4, wherein the two sensors are attached on a same surface of the coil support unit.

6. The storage apparatus according to claim 4, wherein the two sensors are attached on opposite surfaces of the coil support unit.

7. The storage apparatus according to claim 4, wherein the vibration detected signals of the two sensors include in phase bending vibration component and reversed phase twisting vibration component, and the vibration detected signals of the two sensors are additive synthesized in phase to output a vibration detected signal in which the twisting vibration component is reduced and the bending vibration component is emphasized.

8. The storage apparatus according to claim 7, wherein the vibration detected signals from the two sensors are input to an addition circuit to output an additive synthesized vibration detected signal.

9. The storage apparatus according to claim 7, wherein output terminals of the two sensors are connected in parallel to output an additive synthesized vibration detected signal.

10. The storage apparatus according to claim 4, wherein the vibration detected signals of the two sensors include in phase bending vibration component and reversed phase twisting vibration component, and the vibration detected signals of the two sensors are additive synthesized at reversed phase to output a vibration detected signal in which the bending vibration component is reduced and the twisting vibration component is emphasized.

11. The storage apparatus according to claim 1, wherein the sensor is a piezoelectric film sensor including polyvinylidene fluoride (PVDF).

12. A control method of a storage apparatus including an actuator for supporting at least one head at one end of a rotatably supported shaft unit and supporting a coil of a voice coil motor on the other end, and moving the head to an arbitrary track position of at least one recording medium; the method including the steps of:
   detecting coil vibration in time of actuator drive by a plurality of sensors attached to the actuator and outputting a vibration detected signal in time of seek or in time of settling of moving the head to a target track position on the recording medium through drive of the actuator and drawing; and
   driving the actuator to reduce a head position error signal based on the vibration detected signal of the sensor.

13. The control method of the storage apparatus according to claim 12, wherein the sensor is attached to a coil support unit of the actuator.

14. The control method of the storage apparatus according to claim 12, wherein the vibration detected signal of the sensor includes bending vibration component of the coil and twisting vibration component of the coil of when the actuator is driven.

15. The control method of the storage apparatus according to claim 12, wherein the sensor is attached to at least two locations of a coil support unit of the actuator, and vibration detected signals of the two sensors are additive synthesized and output to the control unit.

16. The control method of the storage apparatus according to claim 15, wherein the vibration detected signals of the two sensors include in phase bending vibration component and reversed phase twisting vibration component, and the vibration detected signals of the two sensors are additive synthesized in phase to output a vibration detected signal in which the twisting vibration component is reduced and the bending vibration component is emphasized.

17. The control method of the storage apparatus according to claim 16, wherein the vibration detected signals from the two sensors are input to an addition circuit to output an additive synthesized vibration detected signal.

18. The control method of the storage apparatus according to claim 16, wherein output terminals of the two sensors are connected in parallel to output an additive synthesized vibration detected signal.

19. The control method of the storage apparatus according to claim 15, wherein the vibration detected signals of the two sensors include in phase bending vibration component and reversed phase twisting vibration component, and the vibration detected signals of the two sensors are additive synthesized at reversed phase to output a vibration detected signal in which the bending vibration component is reduced and the twisting vibration component is emphasized.

20. The control method of the storage apparatus according to claim 12, wherein the sensor is a piezoelectric film sensor including polyvinylidene fluoride (PVDF).

* * * * *